(12) United States Patent
Follett et al.

(10) Patent No.: US 11,473,973 B2
(45) Date of Patent: Oct. 18, 2022

(54) ULTRAVIOLET FLAME DETECTOR

(71) Applicant: Carrier Corporation, Palm Beach Gardens, FL (US)

(72) Inventors: Gary Follett, Saint Paul, MN (US); Robert L. Fillmore, Bloomington, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/972,284

(22) PCT Filed: Nov. 11, 2019

(86) PCT No.: PCT/US2019/060703
§ 371 (c)(1),
(2) Date: Dec. 4, 2020

(87) PCT Pub. No.: WO2020/112333
PCT Pub. Date: Jun. 4, 2020

(65) Prior Publication Data
US 2021/0239520 A1 Aug. 5, 2021

Related U.S. Application Data

(60) Provisional application No. 62/773,451, filed on Nov. 30, 2018.

(51) Int. Cl.
*G01J 1/42* (2006.01)
*G01J 1/02* (2006.01)
(Continued)

(52) U.S. Cl.
CPC ............. *G01J 1/429* (2013.01); *G01J 1/0271* (2013.01); *G01J 1/0407* (2013.01); *H01J 31/49* (2013.01); *H01J 2231/50021* (2013.01)

(58) Field of Classification Search
CPC ........ G01J 1/429; G01J 1/0271; G01J 1/0407; G01J 2001/4453; G01J 5/0018; H01J 31/49; H01J 2231/50021
See application file for complete search history.

(56) References Cited

U.S. PATENT DOCUMENTS 2,731,579 A * 1/1956 Weiss ...................... H01J 21/36
313/278
3,793,552 A * 2/1974 Glascock, Jr. .......... H01J 47/00
313/539
(Continued)

FOREIGN PATENT DOCUMENTS

CN 101251416 A 8/2008
CN 102542721 A 7/2012
(Continued)

OTHER PUBLICATIONS

International Search Report for International Application No. PCT/US2019/060703, International Filing Date Nov. 11, 2019, dated Mar. 31, 2020, 6 pages.
(Continued)

*Primary Examiner* — Marcus H Taningco
(74) *Attorney, Agent, or Firm* — Cantor Colburn LLP

(57) ABSTRACT

A flame detector that includes a spacer, a UV transparent window, and a UV sensing elements. The spacer has a spacer wall that extends along a first axis between a first spacer end and a second spacer end. The UV transparent window is disposed at the first spacer end. The spacer wall and the UV transparent window define a gas space. The UV sensing elements is disposed within the gas space.

19 Claims, 5 Drawing Sheets

(51) Int. Cl.
*G01J 1/04* (2006.01)
*H01J 31/49* (2006.01)

(56) References Cited

U.S. PATENT DOCUMENTS

| | | |
|---|---|---|
| 4,578,583 A | 3/1986 | Ciammaichella et al. |
| 5,763,888 A | 6/1998 | Glasheen et al. |
| 5,959,301 A * | 9/1999 | Warashina ............. H01J 47/02 250/372 |
| 6,166,647 A | 12/2000 | Wong |
| 7,871,303 B2 | 1/2011 | Cole |
| 8,618,493 B2 | 12/2013 | Mindermann et al. |
| 2002/0089283 A1 | 7/2002 | Francke et al. |
| 2007/0131869 A1 | 6/2007 | Cole et al. |
| 2017/0023402 A1 | 1/2017 | Follett |
| 2017/0350991 A1 | 12/2017 | Friedman |

FOREIGN PATENT DOCUMENTS

| | | | |
|---|---|---|---|
| CN | 102607735 B | 1/2014 | |
| JP | H06333180 A | 12/1994 | |
| JP | H076277 B2 | 1/1995 | |
| JP | 2000286442 A | 10/2000 | |
| JP | 2012207967 A | 10/2012 | |
| JP | 2012207971 A | 10/2012 | |
| JP | 2014194354 A | 10/2014 | |
| WO | WO-2014146673 A1 * | 9/2014 | ............ H01J 43/243 |

OTHER PUBLICATIONS

Siemens Flame Detector Type QRA2(1) Photocell, UV Detector, 2014, 1 page, Newbie Works, Annan, Dumfries & Galloway DG12 5QU Scotland.

Written Opinion for International Application No. PCT/US2019/060703, International Filing Date Nov. 11, 2019, dated Mar. 31, 2020, 11 pages.

* cited by examiner

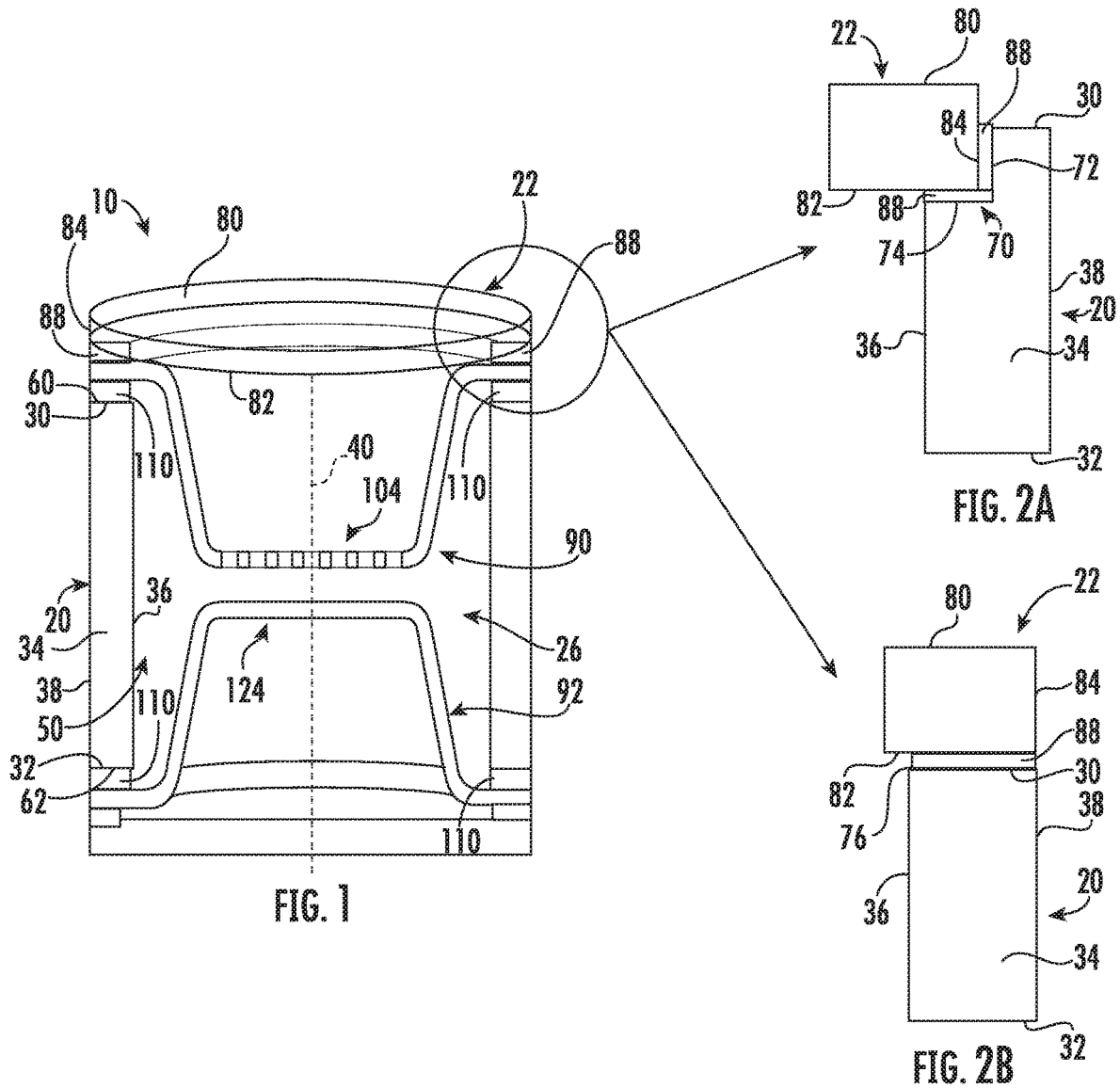

ULTRAVIOLET FLAME DETECTOR

CROSS REFERENCE TO RELATED APPLICATIONS

This is a U.S. National Stage of Application No. PCT/US2019/060703, filed Nov. 11, 2019, which claims priority to U.S. Provisional Application No. 62/773,451, filed Nov. 30, 2018, the disclosures of which are incorporated herein by reference in their entireties.

BACKGROUND

Exemplary embodiments pertain to the art of fire detection systems.

A flame detection system may be configured to sense or detect various attributes of a flame or an impending/burgeoning flame. The flame detection system may include an ultraviolet (UV) sensor that detects UV radiation emitted from the flame. The flame detection system outputs an alarm upon detection of UV radiation greater than a threshold. The flame detection system may erroneously output an alarm due to UV radiation from ambient light. Furthermore, current manufacturing methods of flame detection systems incorporating the UV sensing elements are fairly expensive.

BRIEF DESCRIPTION

Disclosed is a flame detector that includes a spacer, a UV transparent window, and UV sensing elements. The spacer has a spacer wall that extends along a first axis between a first spacer end and a second spacer end. The UV transparent window is disposed at the first spacer end. The spacer wall and the UV transparent window define a gas space. The UV sensing elements are disposed within the gas space.

In addition to one or more of the features described above, or as an alternative to any of the foregoing embodiments, the UV sensing elements include a partially transmissive material disposed on a surface of the UV transparent window; and a cathode disposed within the gas space and extended at least partially into the spacer wall.

In addition to one or more of the features described above, or as an alternative to any of the foregoing embodiments, a second UV transparent window disposed at the second spacer end.

In addition to one or more of the features described above, or as an alternative to any of the foregoing embodiments, the UV sensing elements include an anode disposed within the gas space, proximate the UV transparent window, and extended at least partially into the spacer wall; and a partially transmissive material disposed on a surface of the second UV transparent window.

In addition to one or more of the features described above, or as an alternative to any of the foregoing embodiments, the UV sensing elements include an anode having a perforated feature disposed within the gas space; and a cathode disposed within the gas space and spaced apart from the perforated feature.

In addition to one or more of the features described above, or as an alternative to any of the foregoing embodiments, the cathode includes an extension that extends towards the perforated feature.

In addition to one or more of the features described above, or as an alternative to any of the foregoing embodiments, the extension defines perforations that are offset from and misaligned with the perforated feature of the anode.

Also disclosed is a flame detector that includes a spacer, a UV transparent window, and UV sensing elements. The spacer has a spacer wall disposed about a gas space. The spacer wall extends along a first axis between a first spacer end and a second spacer end. The spacer wall defines a recess that extends from the first spacer end towards the second spacer end. The UV transparent window is disposed within the recess. The UV sensing elements are disposed within the gas space.

In addition to one or more of the features described above, or as an alternative to any of the foregoing embodiments, the UV sensing elements include an anode disposed within the gas space and extended into a first gap defined by the spacer wall; a cathode disposed within the gas space and spaced apart from the anode, the cathode extended into a second gap defined by the spacer wall; and a gas mixture within the gas space that is arranged to enable a gas electron multiplier effect.

In addition to one or more of the features described above, or as an alternative to any of the foregoing embodiments, at least one of the anode and the cathode defines a plurality of perforations.

In addition to one or more of the features described above, or as an alternative to any of the foregoing embodiments, the UV sensing elements include a partially transmissive material disposed on a surface of UV transparent window.

In addition to one or more of the features described above, or as an alternative to any of the foregoing embodiments, a second UV transparent window disposed at the second spacer end.

In addition to one or more of the features described above, or as an alternative to any of the foregoing embodiments, the UV sensing elements include a second partially transmissive material disposed on a surface of the second UV transparent window.

In addition to one or more of the features described above, or as an alternative to any of the foregoing embodiments, the recess includes a first surface that is disposed parallel to the first axis and a second surface that extends from the first surface and is disposed perpendicular to the first axis.

In addition to one or more of the features described above, or as an alternative to any of the foregoing embodiments, the second surface extends from an inner surface towards an outer surface.

In addition to one or more of the features described above, or as an alternative to any of the foregoing embodiments, the UV transparent window includes a pair of window surfaces and a circumferential surface that extends between the pair of window surfaces.

In addition to one or more of the features described above, or as an alternative to any of the foregoing embodiments, at least one of the pair of window surfaces of the UV transparent window engages the second surface.

In addition to one or more of the features described above, or as an alternative to any of the foregoing embodiments, a first patterned metal anode is disposed on a surface of the UV transparent window.

In addition to one or more of the features described above, or as an alternative to any of the foregoing embodiments, a second UV transparent window disposed at the second spacer end; and a second patterned metal anode disposed on a surface of the second UV transparent window.

In addition to one or more of the features described above, or as an alternative to any of the foregoing embodiments, a central plate disposed within the gas space and disposed between the UV transparent window and the second UV transparent window.

Further disclosed is a method of manufacturing a flame detector that includes applying a first joining material to at least one of a surface of a UV transparent window and a surface of a spacer; applying a second joining material to gaps within a wall of the spacer; disposing a UV transparent window proximate an end surface of the spacer; and inserting ends of at least one of an anode and cathode of the UV sensing elements into the gaps.

In addition to one or more of the features described above, or as an alternative to any of the foregoing embodiments, cleaning the anode and the cathode.

In addition to one or more of the features described above, or as an alternative to any of the foregoing embodiments, heating the first joining material to a first temperature within a vacuum process chamber to join the UV transparent window to the end surface of the spacer; and heating the second joining material to a second temperature within the vacuum process chamber to join at least one of the anode and cathode of the UV sensing elements to the spacer, wherein the second temperature is different from the first temperature.

In addition to one or more of the features described above, or as an alternative to any of the foregoing embodiments, cleaning the partially assembled flame detector within the vacuum process chamber.

In addition to one or more of the features described above, or as an alternative to any of the foregoing embodiments, filling a gas space within the spacer with a gas composition.

In addition to one or more of the features described above, or as an alternative to any of the foregoing embodiments, applying at least one of the first joining material and the second joining material to a second end surface of the spacer disposed opposite the end surface; disposing a second UV transparent window on at least one of the first joining material and the second joining material; and heating at least one of the first joining material and the second joining material within the vacuum process chamber to join the second UV transparent window to the second end surface of the spacer.

BRIEF DESCRIPTION OF THE DRAWINGS

The following descriptions should not be considered limiting in any way. With reference to the accompanying drawings, like elements are numbered alike:

FIG. 1 is a partial sectional view of an ultraviolet flame detector;

FIG. 2A is a partial cross-sectional view of a portion of the ultraviolet flame detector;

FIG. 2B is a partial cross-sectional view of a portion of the ultraviolet flame detector;

DETAILED DESCRIPTION

Figure 3:
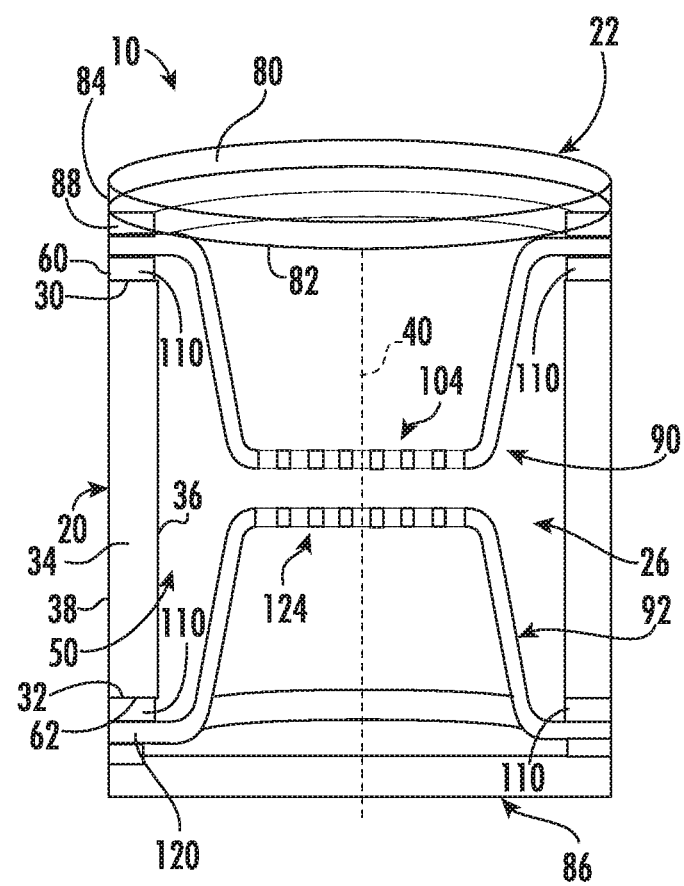
FIG. 3 is a partial sectional view of an ultraviolet flame detector.

A detailed description of one or more embodiments of the disclosed apparatus and method are presented herein by way of exemplification and not limitation with reference to the Figures.

The present disclosure provides a compact UV flame detector capable of two-sided detection of flames through UV transparent caps or windows. The UV flame detector is made by a process that minimizes manual handling of the clean UV flame detector parts and employs a vacuum process chamber having dual heating zones that function at different temperatures. The dual heating zones facilitate the processing of the UV flame detector within a single vacuum process chamber.

Referring to FIG. 1, an ultraviolet (UV) flame detector 10, is shown. The UV flame detector 10 is arranged to receive UV light from a flame that may cause a photoelectric response within the UV flame detector 10 such that a fire or a flame may be detected. The UV flame detector 10 includes a spacer 20, a UV transparent window 22 and a UV sensing elements 26.

The spacer 20 may be arranged as a vessel, a housing, a tube or the like that receives the UV sensing elements 26. The spacer 20 is at least partially sealed by the UV transparent window 22 at a first spacer end 30 and is completely sealed at a second spacer end 32 by the UV sensing elements 26. The spacer 20 may be made of a ceramic material, however other electrically insulating and vacuum tight are also contemplated.

The spacer 20 includes a spacer wall 34 having an inner surface 36 and an outer surface 38 that is disposed opposite the inner surface 36. The inner surface 36 and the outer surface 38 each extend along a first axis 40 (e.g. a central longitudinal axis) between the first spacer end 30 and the second spacer end 32.

An axial length of the spacer 20, along the first axis 40, may be substantially equal to a cross-sectional form (e.g. cross-sectional diameter) of the spacer 20. In other embodiments, the axial length of the spacer 20 may be different than the cross-sectional form of the spacer 20.

The inner surface 36 of the spacer wall 34 and a portion of the UV transparent window 22 define an internal volume or a gas space 50 that may receive a gas mixture of composition and pressure suitable to enable signal amplification by virtue of the gas electron multiplier effect, for the UV sensing elements 26. The spacer wall 34 circumscribes or is disposed about the gas space 50.

The spacer wall 34 defines a first gap 60 and a second gap 62. The first gap 60 is disposed proximate the first spacer end 30 and extends about the spacer wall 34. The first gap 60 extends from the inner surface 36 towards the outer surface 38. The second gap 62 is disposed proximate the second spacer end 32 and extends about the spacer wall 34 and the second gap 62 is spaced apart from the first gap 60. The gaps may be openings, notches, grooves, recesses, through holes, ledges, or the like that are arranged to at least partially receive or retain a portion of the UV sensing elements 26 and be filled with a bonding/sealing material.

The spacer wall 34 may define a recess 70, as shown in FIG. 2A. The recess 70 may axially extend from the first spacer end 30 towards the second spacer end 32 along the first axis 40. The recess 70 may radially extend from the inner surface 36 towards the outer surface 38.

The recess 70 includes a first surface 72 and a second surface 74. The first surface 72 is disposed parallel to the first axis 40 and extends from the first spacer end 30 towards the second spacer end 32. The first surface 72 may extend to the second surface 74. The second surface 74 may be disposed generally perpendicular to the first axis 40. The second surface 74 may extend from the first surface 72 towards the inner surface 36.

The spacer wall 34 may define or include an end surface 76, as shown in FIG. 2B. The end surface 76 may be a generally planar surface that is disposed at the first spacer end 30. The end surface 76 may be the first spacer end 30 and may be disposed substantially transverse to first axis 40.

Referring to FIGS. 1, 2A, 2B, and 3, the UV transparent window 22 is disposed proximate the first spacer end 30 and is sealingly joined to the spacer 20. The UV transparent window 22 may be an optical window made from UV transmissive materials such as sapphire, glass, or other UV transmissive materials.

The UV transparent window 22 includes a first window surface 80, a second window surface 82, and a side surface or a circumferential surface 84. The first window surface 80 may be disposed opposite the second window surface 82. The first window surface 80 and the second window surface 82 may form a pair of generally planar surfaces, may form a pair of generally non-planar surfaces, or may be in the form of a lens (e.g. concave or convex lens) if there is a need to focus the imaging field of view of the sensor. The circumferential surface 84 extends between the pair of window surfaces.

The UV transparent window 22 may be at least partially received within the recess 70, as shown in FIG. 2A. The circumferential surface 84 may engage or may disposed on the first surface 72 of the recess 70. At least one of the window surfaces (e.g. the first window surface 80 or the second window surface 82) may engage or may be disposed on the second surface 74 of the recess 70. The UV transparent window 22 may be joined to the recess 70 to at least partially seal the spacer 20 by a first joining material 88. The first joining material 88 may be disposed on and between the first surface 72 and the second surface 74 of the recess 70 and the circumferential surface 84 and the second window surface 82 of the UV transparent window 22.

The UV transparent window 22 may engage or be disposed on the end surface 76 of the spacer wall 34, as shown in FIG. 2B. The UV transparent window 22 may be joined to the end surface 76 to at least partially seal the spacer 20 by a first joining material 88. The first joining material 88 may be disposed on the end surface 76 of the spacer 20.

A transparent cover or a second UV transparent window 86 is disposed opposite the UV transparent window 22, as shown in FIG. 3. The second UV transparent window 86 may have a substantially similar configuration as the UV transparent window 22. The second UV transparent window 86 may be disposed proximate or on the second spacer end 32. The second UV transparent window 86 may abut or extend at least partially into the spacer wall 34 proximate the second spacer end 32. The second UV transparent window 86 may be joined to the spacer wall 34 to at least partially seal the spacer 20 by the first joining material 88 or a second joining material.

The UV sensing elements 26 are disposed within the gas space 50. The UV sensing elements 26 includes an anode 90 and a cathode 92.

The anode 90 is disposed proximate the UV transparent window 22 proximate the first spacer end 30. The anode 90 is arranged to collect or attract emitted electrons from the cathode 92. The anode 90 includes a perforated region or a perforated feature 104 defining a plurality of perforations.

The anode 90 extends into the first gap 60 of the spacer wall 34 and/or is joined to the spacer wall 34 proximate or within the second gap 62, proximate the first spacer end 30. The anode 90 may be secured within the first gap 60 by a second joining material 110.

The perforated feature 104 is disposed between or spaced apart from outer edges or ends of the anode 90. The perforated feature 104 extends towards the cathode 92. The perforated feature 104 is arranged to permit light that enters through the UV transparent window 22 to pass to the cathode 92.

The cathode 92 is disposed within the gas space 50 and is spaced apart from the perforated feature 104 of the anode 90 by an insulating gap or an insulating space. The cathode 92 is photosensitive such that the cathode 92 emits electrons when exposed to UV light or illuminated. A voltage difference between the anode 90 and the cathode 92 in the presence of illumination or UV light enables the UV flame detector 10 to detect the presence of a flame. The cathode 92 may be a photo cathode that includes a recessed portion or an extension 124.

The cathode 92 extends into the second gap 62 of the spacer wall 34 and/or is joined to the spacer wall 34 proximate or within the second gap 62, proximate the second spacer end 32. The cathode 92 may be secured within the second gap 62 by the second joining material 110.

The recessed portion or extension 124 is disposed between or spaced apart from outer edges or ends of the cathode 92. The extension 124 extends towards the perforated feature 104 of the anode 90.

The extension 124 may define a plurality of perforations, as shown in FIG. 3. The perforations of the extension 124 of the cathode 92 may be offset from the perforations of the perforated feature 104 of the anode 90 such that the perforations of the extension 124 of the cathode 92 are misaligned with the perforations of the perforated feature 104 of the anode 90. In this arrangement, light may pass through the UV transparent window 22 disposed proximate the first spacer end 30 and the light may pass through the perforated feature 104 of the anode 90 and fall on the solid surfaces of the cathode 92. Furthermore, light may also pass through the second UV transparent window 86 disposed proximate the second spacer end 32 and the light may pass through the perforations of the extension 124 of the cathode 92 and fall on the solid surfaces of the anode 90.

External electronics may be connected to the anode 90 and the cathode 92 that may switch the polarity (e.g. applying AC power that switches polarity with time) applied to the anode 90 and the cathode 92 to enable the sequential two-sided detection as described above. The polarity may be alternated such that the UV flame detector 10 may sequentially detect a flame through the UV transparent window 22 for a first time period and then detect a flame through the second UV transparent window 86 for a second time period.

Figure 4A:
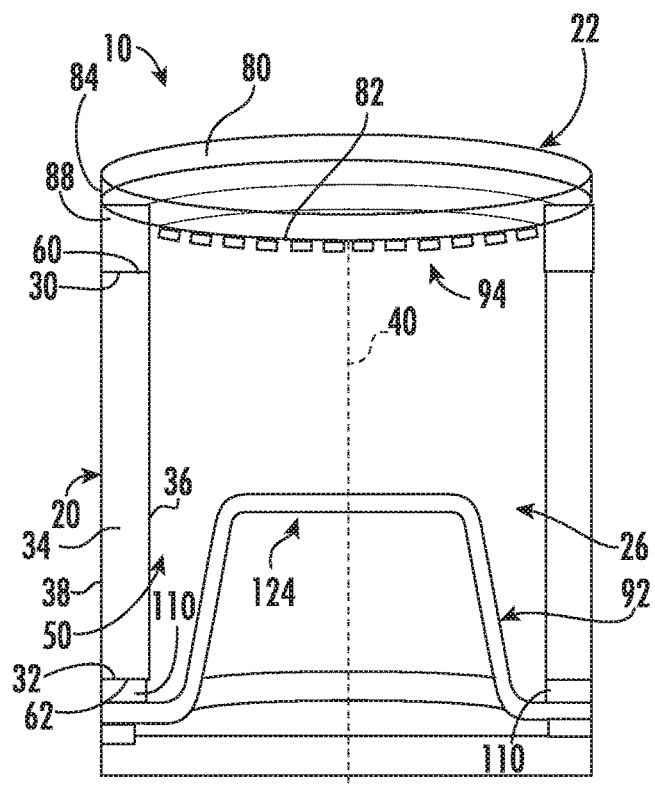
FIG. 4A is a partial sectional view of the ultraviolet flame detector having a partially transmissive material in place of an anode.

A partially transmissive surface or a partially transmissive material 94 may be disposed on or proximate the UV transparent window 22, as shown in FIG. 4A. The partially transmissive material may be disposed on or proximate at least one of the first window surface 80 and/or the second window surface 82. The partially transmissive material may be a metal in a grid or other pattern that allows light to pass to the UV sensing elements 26. The partially transmissive material may function in a similar manner as an anode, eliminating the need for a traditional anode.

Figure 4B:
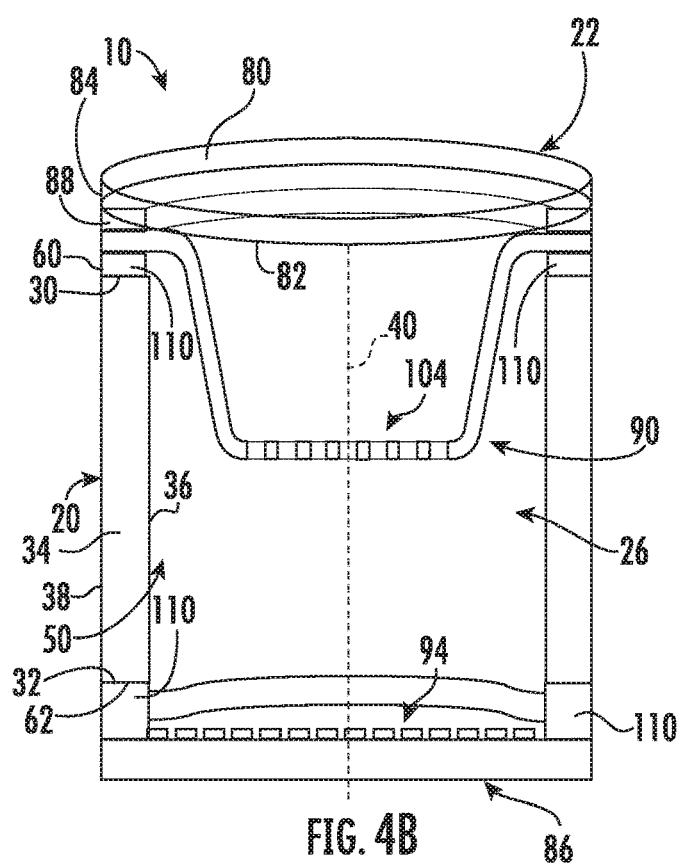
FIG. 4B is a partial sectional view of the ultraviolet flame detector having a partially transmissive material in place of a cathode.

A partially transmissive surface or a partially transmissive material 94 may be disposed on or proximate the second UV transparent window 86, as shown in FIG. 4B. The partially transmissive material may be a metal in a grid or other pattern that allows light to pass to the UV sensing elements 26. The metal applied to the second UV transparent window 86 may be of a suitable work function to provide sensitivity to selected or specific wavelengths, such as nickel. The partially transmissive material may function in a similar manner as a cathode, eliminating the need for a traditional cathode.

Figure 4C:
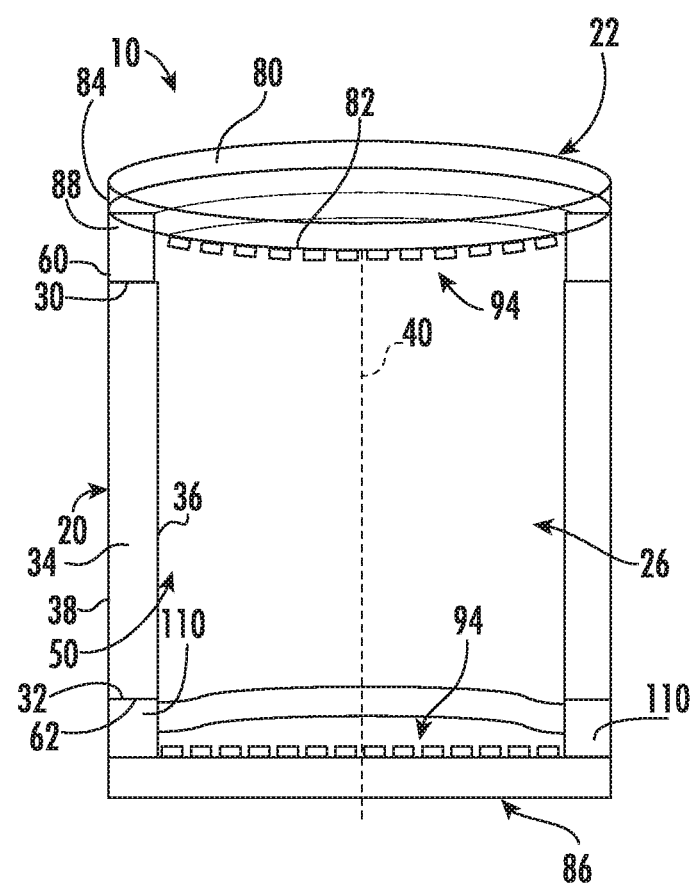
FIG. 4C is a partial sectional view of the ultraviolet flame detector having partially transmissive materials in place of an anode and a cathode.

A partially transmissive material 94 may be disposed on a surface of the UV transparent window 22 and a second partially transmissive material 96 may be disposed on a surface of the second UV transparent window 86, as shown in FIG. 4C. The partially transmissive material 94 may replace the anode 90 and the second partially transmissive material 96 may replace the cathode 92. The partially transmissive material 94 may be patterned with holes, gaps, or openings that are offset from holes, gaps, or openings that are patterned within the second partially transmissive material 96. This arrangement provides two-sided sensitivity of the UV flame detector 10, enabling opposing ends of the UV flame detector 10 to detect the presence of a flame and also minimizes the overall size of the UV flame detector 10.

The replacement or substitution of at least one of the anode 90 and/or the cathode 92 of the UV sensing elements 26 with partially transmissive materials 94, 96, as shown in FIGS. 4A-4C, may aid in reducing the overall size of the UV flame detector 10 and simplify the arrangement of the UV flame detector. These arrangements may also ease fabrication of the UV flame detector 10.

The UV flame detector 10 may be arranged in an array with other UV flame detectors. A first plurality of UV flame detectors may be arranged within or on a first member having a first shape. A second plurality of UV flame detectors be arranged within or on a second member having a second shape. The second member may be joined to the first member and oriented relative to the first member such that a 2-D or multiple dimension array of UV flame detectors. The first shape and the second shape may have a generally planar, arcuate, or other shape.

Figure 5A:
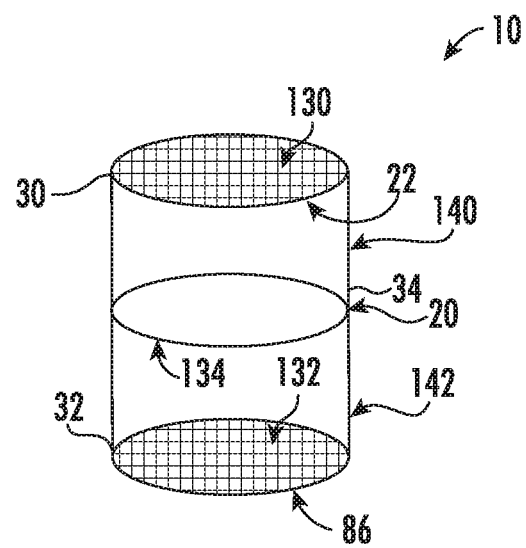
FIGS. 5A-5C are views of the ultraviolet flame detector having double ended sensitivity.
Figure 5B:
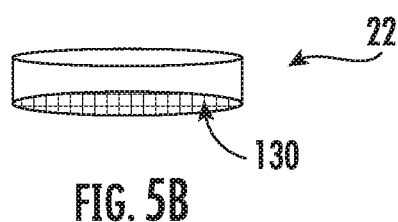
Figure 5C:
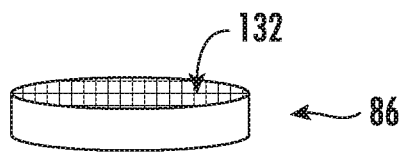

Referring to FIGS. 5A-5C, the UV flame detector 10 may be arranged as a double ended UV tube. A first patterned metal anode 130 or partially transparent elements or films may be disposed on a surface of the UV transparent window 22, as shown in FIG. 5B, and a second patterned metal anode 132 may be disposed on a surface of the second UV transparent window 86 or partially transparent elements or films, as shown in FIG. 5C. The UV transparent window 22 having the first patterned metal anode 130 is disposed at or affixed to the first spacer end 30 and the second UV transparent window 86 having the second patterned metal anode 132 is disposed at or affixed to the second spacer end 32.

A central plate 134 extends into the gas space 50 and is disposed between the UV transparent window 22 having the first patterned metal anode 130 and the second UV transparent window 86 having the second patterned metal anode 132. The central plate 134 serves as a cathode (e.g. photo-responsive element) for each side of the UV tube, e.g. the first spacer end 30 and the second spacer end 32. The central plate 134 may be fabricated with perforations or other features outside of the photo-active area to allow both sides of the double ended UV tube to share the same fill gas. In at least one embodiment, the gas space 50 may be separated into two distinct and separate gas spaces by the central plate 134, such that a region between the central plate 134 and the first spacer end 30 defines a first UV tube 140 and another region between the central plate 134 and the second spacer end 32 defines a second UV tube 142. The first UV tube 140 is connected to separate circuitry from the second UV tube 142 to register the signals from each other by either multiplexing or dedicated circuitry.

The arrangement of the double ended UV tube of FIGS. 5A-5C eliminates the need to align offset holes in anode/cathode pairs to achieve double-ended sensitivity, thereby simplifying fabrication of the UV flame detector 10. The arrangement of the double ended UV tube of FIGS. 5A-5C eliminates the need for alternating polarity voltage for operation because the first patterned metal anode 130 and the second patterned metal anode 132 may be at the same potential, with the central plate 134 or cathode at the opposite polarity.

The UV flame detector 10 may be more compact as compared to previous flame detector designs as well as having greater resistance to physical shock and vibration due to the construction and manufacturing process as will be described below.

The manufacturing process with which the UV flame detector 10 may be manufactured includes providing the spacer 20, the UV transparent window 22, the anode 90, and the cathode 92.

The first joining material 88 may be applied to a surface of the UV transparent window 22 or may be applied to at least one of the recess 70 and/or the end surface 76 of the spacer wall 34. The first joining material 88 may be a solder or other joining material having a first melting point.

The second joining material 110 may be applied to the first spacer end 30 and the second spacer end 32. The second joining material 110 may be applied to the first gap 60 and the second gap 62 to seal the gaps. The second joining material 110 may be a solder or other joining material having a second melting point. The second melting point of the second joining material 110 may be greater than the first melting point of the first joining material 88. In at least one embodiment, the second melting point of the second joining material 110 may be substantially equal to the first melting point of the first joining material 88 such that the first joining material 88 is the same as the second joining material 110.

The spacer 20, the UV transparent window 22, the anode 90, and the cathode 92 may be cleaned using various cleaning processes, as known to one of ordinary skill in the art. In at least one embodiment, the anode 90 and/or the cathode 92 may be further cleaned to provide a clean, smooth, and oxide free surfaces.

The UV transparent window 22 may be disposed proximate but spaced apart from the spacer 20 by a fixture, such that the UV transparent window 22 is disposed proximate an end surface of the spacer 20. The anode 90 and the cathode 92 of the UV sensing elements 26 may be disposed within the spacer 20, having their respective ends extend into but spaced apart from their respective gaps of the spacer wall 34 by the fixture.

A vacuum process chamber having heaters may be preheated to a predetermined temperature and may also have a vacuum applied prior to the partially assembled UV flame detector 10 being disposed within the vacuum chamber. The fixture that spaces the various components of the partially assembled UV flame detector 10 apart from each other may be provided with the vacuum process chamber.

The partially assembled UV flame detector 10, comprising of the UV transparent window 22, the spacer 20, the anode 90, and the cathode 92 may be disposed within the vacuum process chamber. The partially assembled UV flame detector 10 may be essentially an open-ended tube at this point in the manufacturing process.

The vacuum process chamber may be provided with dual heating zones that function at different temperatures to enable the processing of the UV flame detector 10 within a single process chamber. In such an arrangement, the vacuum process chamber includes a first heater disposed within or defining a first heat zone and a second heater disposed within or defining a second heat zone. The first and second heaters may be arranged as radiant heaters. In at least one embodiment, a single heater defining a single heat zone may be provided. The single heater may be capable of operating at two different temperatures such that a first temperature may be applied to a first portion of the partially assembled UV flame detector 10 and a second temperature to a second portion of the partially assembled UV flame detector 10 that is disposed opposite the first portion.

A heat shield may be disposed between the first heat zone and the second heat zone to inhibit or restrict heat transfer between the first heat zone and the second heat zone. The first spacer end 30 upon which the UV transparent window 22 may be disposed, may extend into or may be disposed within the first heat zone. The first heater is provided to heat the first joining material 88 to a first temperature, such as proximate the first melting point. The second spacer end 32 may extend into or may be disposed within the second heat zone. The second heater is provided to heat the second joining material 110 to a second temperature, such as proximate the second melting point. The vacuum process chamber may substantially simultaneously apply a vacuum and apply heat to the partially assembled UV flame detector 10 to melt the joining materials. Alternatively, the vacuum and the heating may be applied serially.

The UV transparent window 22 may be joined to the spacer 20 by the heating/melting of the first joining material 88 by the first heater to seal the spacer 20. In at least one embodiment, the UV transparent window 22 may be brought into contact with at least a portion of the anode 90 and may ultimately be joined to at least a portion of the anode 90. The UV transparent window 22 may be joined to the spacer 20 subsequent to the UV sensing elements 26 being joined to the spacer 20.

The anode 90 and the cathode 92 may be joined to the spacer 20 by the melting of the second joining material 110 by the second heater.

The partially assembled UV flame detector 10 may be cleaned within the vacuum process chamber using a method that may remove any remaining contaminants. At least a portion of any remaining contaminants may be pumped or removed from the vacuum process chamber to achieve a predetermined acceptable level of cleanliness or predetermined acceptable level of contaminants. The initial and the subsequent cleaning of the UV flame detector within the vacuum process chamber limits or inhibits the formation of deposits (or gas phase contaminants) should the gas composition become excited during detection, limiting the possibility of false alarms or erroneous detection of flames.

The gas space 50 may be filled with the gas composition. The gas composition may be a final gas or a discharge gas at a pressure greater than the vacuum pressure. The gas space 50 may be filled with the gas composition through a port or a tube.

At least one of the first joining material 88 and the second joining material 110 may be applied to a second end surface of the spacer 20 that is disposed opposite the end surface of the spacer 20. The second UV transparent window 86 may be joined to the second end surface of the spacer 20 by the melting/heating of east one of the first joining material 88 and the second joining material 110 to seal the spacer 20. In at least one embodiment, the second UV transparent window 86 may be brought into contact with at least a portion of the cathode 92 and may ultimately be joined to at least a portion of the cathode 92. The second UV transparent window 86 may be joined to the spacer 20 subsequent to the UV sensing elements 26 being joined to the spacer 20.

The assembled UV flame detector 10 may be cooled within the vacuum process chamber to a predetermined temperature to enable or facilitate the handling of the UV flame detector 10. Upon achieving the predetermined temperature, the assembled UV flame detector 10 may be removed from the vacuum process chamber.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flame detector, comprising:
   a spacer having a spacer wall extending along a first axis between a first spacer end and a second spacer end;
   a UV transparent window disposed at the first spacer end;
   the spacer wall and the UV transparent window defining a gas space; and
   UV sensing elements disposed within the gas space;
   the spacer wall defining a recess that extends from the first spacer end towards the second spacer end;
   wherein the UV sensing elements include:
   an anode disposed within the gas space and extending into a first gap defined by the spacer wall;
   a cathode disposed within the gas space and spaced apart from the anode, the cathode extends into a second gap defined by the spacer wall; and
   a gas mixture within the gas space, the gas mixture being arranged to enable a gas electron multiplier effect.

2. The flame detector of claim 1, wherein the UV sensing elements includes:
   a partially transmissive material disposed on a surface of the UV transparent window; and
   a cathode disposed within the gas space and extended at least partially into the spacer wall.

3. The flame detector of claim 1, further comprising:
a second UV transparent window disposed at the second spacer end.

4. The flame detector of claim 3, wherein the UV sensing elements include:
a partially transmissive material disposed on a surface of the second UV transparent window.

5. The flame detector of claim 1, wherein the anode includes a perforated feature disposed within the gas space; and
the cathode is spaced apart from the perforated feature.

6. The flame detector of claim 5, wherein the cathode includes an extension that extends towards the perforated feature.

7. The flame detector of claim 6, wherein the extension defines perforations that are offset from and misaligned with the perforated feature of the anode.

8. A flame detector, comprising:
a spacer having a spacer wall disposed about a gas space, the spacer wall extending along a first axis between a first spacer end and a second spacer end, the spacer wall defining a recess that extends from the first spacer end towards the second spacer end;
a UV transparent window disposed within the recess; and
a UV sensing elements disposed within the gas space;
wherein the UV sensing elements includes:
an anode disposed within the gas space and extending into a first gap defined by the spacer wall;
a cathode disposed within the gas space and spaced apart from the anode, the cathode extends into a second gap defined by the spacer wall; and
a gas mixture within the gas space, the gas mixture being arranged to enable a gas electron multiplier effect.

9. The flame detector of claim 8, wherein at least one of the anode and the cathode defines a plurality of perforations.

10. The flame detector of claim 8, wherein the UV sensing elements includes a partially transmissive material disposed on a surface of UV transparent window.

11. The flame detector of claim 8, wherein the recess includes a first surface that is disposed parallel to the first axis and a second surface that extends from the first surface and is disposed perpendicular to the first axis.

12. The flame detector of claim 11, wherein the second surface extends from an inner surface towards an outer surface.

13. The flame detector of claim 8, wherein a first patterned metal anode is disposed on a surface of the UV transparent window.

14. The flame detector of claim 13, further comprising:
a second UV transparent window disposed at the second spacer end; and
a second patterned metal anode disposed on a surface of the second UV transparent window.

15. The flame detector of claim 14, further comprising a central plate disposed within the gas space and disposed between the UV transparent window and the second UV transparent window.

16. A method of manufacturing a flame detector, comprising:
applying a first joining material to at least one of a surface of a UV transparent window and a surface of a spacer;
applying a second joining material to gaps within a wall of the spacer;
disposing a UV transparent window proximate an end surface of the spacer; and
inserting ends of at least one of an anode and cathode of UV sensing elements into the gaps.

17. The method of claim 16, further comprising:
heating the first joining material to a first temperature within a vacuum process chamber to join the UV transparent window to the end surface of the spacer; and
heating the second joining material to a second temperature within the vacuum process chamber to join at least one of the anode and cathode of the UV sensing elements to the spacer, wherein the second temperature is different from the first temperature.

18. The method of claim 17, further comprising at least one of:
cleaning the partially assembled flame detector within the vacuum process chamber; and
filling a gas space within the spacer with a gas composition.

19. The method of claim 18, further comprising:
applying at least one of the first joining material and the second joining material to a second end surface of the spacer disposed opposite the end surface;
disposing a second UV transparent window on at least one of the first joining material and the second joining material; and
heating at least one of the first joining material and the second joining material within the vacuum process chamber to join the second UV transparent window to the second end surface of the spacer.

* * * * *